(12) United States Patent
Cai et al.

(10) Patent No.: US 10,339,158 B2
(45) Date of Patent: *Jul. 2, 2019

(54) GENERATING A MAPPING RULE FOR CONVERTING RELATIONAL DATA INTO RDF FORMAT DATA

(71) Applicant: International Business Machines Corporation, Armonk, NY (US)

(72) Inventors: Peng Cai, Shanghai (CN); Feng Cao, Shanghai (CN); Yuan Ni, Shanghai (CN); Hui Jia Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 583 days.

This patent is subject to a terminal disclaimer.

(21) Appl. No.: 14/747,035

(22) Filed: Jun. 23, 2015

(65) Prior Publication Data

US 2015/0347485 A1 Dec. 3, 2015

Related U.S. Application Data

(63) Continuation of application No. 14/721,140, filed on May 26, 2015.

(30) Foreign Application Priority Data

May 30, 2014 (CN) .......................... 2014 1 0241150

(51) Int. Cl.
*G06F 7/00* (2006.01)
*G06F 17/30* (2006.01)
(Continued)

(52) U.S. Cl.
CPC .......... *G06F 16/284* (2019.01); *G06F 16/211* (2019.01); *G06F 16/214* (2019.01);
(Continued)

(58) Field of Classification Search
CPC ......... G06F 17/30569; G06F 17/30914; G06F 17/30292; G06F 17/30507; G06F 17/30595
See application file for complete search history.

(56) References Cited

U.S. PATENT DOCUMENTS 7,818,352 B2 * 10/2010 Krishnamoorthy ..........................
G06F 17/30448
707/760
9,836,503 B2 * 12/2017 Perry ................ G06F 16/24532
(Continued)

OTHER PUBLICATIONS

List of IBM Patents Applications Treated As Related; CN920140068US2, Date file: Jun. 23, 2015, pp. 1-2.
(Continued)

*Primary Examiner* — Hasanul Mobin
(74) *Attorney, Agent, or Firm* — Cantor Colburn LLP; Grant Johnson (57) ABSTRACT

A method for generating a mapping rule for converting relational data into RDF format data includes obtaining a first mapping rule for converting relational data in a first relational database into RDF format data, wherein a URI pattern of the first mapping rule expresses features of the relational data in the first relational database; parsing a generated rule for the URI pattern of the first mapping rule; determining that a second relational model of the second relational database and a first relational model of the first relational database conform to pattern matching; and generating a second mapping rule for converting the relational data of the second relational database into RDF format data, based on a mapping relationship between the generated rule and the pattern matching of the first relational model and the second relational model.

9 Claims, 5 Drawing Sheets

(51) Int. Cl.
  *G06F 16/28* (2019.01)
  *G06F 17/27* (2006.01)
  *G06F 16/84* (2019.01)
  *G06F 16/21* (2019.01)
  *G06F 16/2455* (2019.01)

(52) U.S. Cl.
  CPC ........ *G06F 16/24564* (2019.01); *G06F 16/84* (2019.01); *G06F 17/27* (2013.01)

(56) References Cited

U.S. PATENT DOCUMENTS

| | | | | |
|---|---|---|---|---|
| 2003/0093416 | A1* | 5/2003 | Akaboshi | G06F 17/30548 |
| 2006/0235823 | A1* | 10/2006 | Chong | G06F 16/2455 |
| 2009/0138437 | A1* | 5/2009 | Krishnamoorthy | G06F 16/24534 |
| 2009/0138498 | A1* | 5/2009 | Krishnamoorthy | G06F 16/24534 |
| 2010/0241644 | A1* | 9/2010 | Jackson | G06F 16/2423 707/760 |
| 2011/0238683 | A1* | 9/2011 | Kim | G06F 16/2452 707/760 |
| 2012/0011167 | A1* | 1/2012 | Schmidt | G06F 17/3087 707/802 |
| 2013/0124574 | A1* | 5/2013 | Brettin | G06F 19/28 707/798 |
| 2013/0318070 | A1* | 11/2013 | Wu | G06F 16/284 707/722 |
| 2014/0156638 | A1* | 6/2014 | Joshi | G06F 16/254 707/722 |
| 2014/0172914 | A1* | 6/2014 | Elnikety | G06F 16/9024 707/774 |
| 2014/0304251 | A1* | 10/2014 | Bornea | G06F 16/2453 707/718 |
| 2015/0205880 | A1* | 7/2015 | Perry | G06F 16/24532 707/771 |

OTHER PUBLICATIONS

Peng Cai, et al.," Generating a Mapping Rule for Converting Relational Data Into RDF Format Data," U.S. Appl. No. 14/721,140, filed May 26, 2015.

Chinese First Office Action cited in Application No. 201410241150.1 dated May 31, 2018, 12 pgs.

Haiyan et al., "Semantic Pattern Mapping Between RDBMS and Linked Data Based on Open Source Software," DLIB & OSS 2011, 1994-2018 China Academic Journal Electronic Publishing House, Xiandai Tushu Qingbao Jishu, Jul. 8, 2011, 7 pgs.

Berardi et al., StdTrip+K: Design Rationale in the RDB-to-RDF Process, SpringerLink, https://link.springer.com/chapter/10.1007/978-3-642-40285-2_26, Feb. 9, 2018, 9 pgs.

* cited by examiner

GENERATING A MAPPING RULE FOR CONVERTING RELATIONAL DATA INTO RDF FORMAT DATA

DOMESTIC AND FOREIGN PRIORITY

This application is a continuation of U.S. patent application Ser. No.: 14/721,140, filed May 26, 2015, which claims priority to Chinese Patent Application No. 201410241150.1, filed May 30, 2014, and all the benefits accruing therefrom under 35 U.S.C. § 119, the contents of which in its entirety are herein incorporated by reference.

BACKGROUND

The present invention relates to a database, and more specifically, to a method and apparatus for generating a mapping rule for converting relational data into RDF format data.

Semantic web is a concept proposed by the father of World Wide Web, Tim Berners-Lee in 1998. The core of the semantic web is to provide the computer with the ability to understand the association relationship between data in a document so that the computer can automatically process information on the semantic web. The vision of the semantic web is to publish and link the global data. The semantic web describes data using RDF (Resource Description Framework). The basic ideas of RDF are: (1) all objects (specific or abstract, existing or non-existing) that can be identified on Web being called as "resources"; (2) using URI (Universal Resource Identifier) to identify resources; (3) using property and property values to describe resources. The basic structure of any expression in RDF is a collection of triples, each triple consisting of a subject, a predicate and an object. The subject corresponds to the resource and is anything that can possess a URI, e.g., http://dbpedia.org/resource/China; the predicate corresponds to the property and is a resource possessing a title, e.g., author, firstname; the object corresponds to the property value and can be a character string or another resource, e.g., david or http://dbpeida.org/resource/United_States.

With the rapid development of the semantic web, more and more data providers and Web application developers publish data in RDF format, and link with other data sources to form a huge linked data network. For example, Wikipedia is published as DBpedia; IMDB dataset and GeoSpacial dataset are published as RDF format as well. Up to now, there are 61 billion triples in total on the linked data.

Not only Public Web, with the coming of enterprise 2.0, inside the enterprise, more and more data are urgently needed to link with data on Web to thereby build a better application and service. However, the existing data, especially data inside the enterprise mostly exist in the relational database, and thus we need a tool to publish the relational data as RDF data. At present, there exists a tool for publishing the relational data as RDF data, for example, D2R is the most widely used tool, and it comprises a D2R server, a D2RQ engine and a D2RQ mapping language, wherein the main function of the D2RQ mapping language is to define a mapping rule for converting the relational data into RDF format. However, the URI automatically generated based on the mapping rule is meaningless, and cannot express the features of the relational data; it is necessary to manually modify the mapping rule, and the features of the relational data can be expressed based on the modified mapping rule; while for a complex relational database, it generally comprises hundreds of mapping rules, and modifying the mapping rules generally needs much tedious manual labors.

SUMMARY

According to one embodiment of the present invention, there is provided a method for generating a mapping rule for converting relational data into RDF format data, comprising: obtaining a first mapping rule for converting relational data in a first relational database into RDF format data, wherein a URI pattern of the first mapping rule expresses features of the relational data in the first relational database; parsing the generated rule for the URI pattern of the first mapping rule; determining that a second relational model of the second relational database and a first relational model of the first relational database conform to pattern matching; and generating a second mapping rule for converting the relational data of the second relational database into RDF format data, based on a mapping relationship between the generated rule and the pattern matching of the first relational model and the second relational model.

According to another embodiment of the present invention, there is provided an apparatus for generating a mapping rule for converting relational data into RDF format data, comprising: an obtaining module configured to obtain a first mapping rule for converting relational data in a first relational database into RDF format data, wherein a URI pattern of the first mapping rule expresses features of the relational data in the first relational database; a parsing module configured to parse a generated rule for the URI pattern of the first mapping rule; a first determining module configured to determine that a second relational model of the second relational database and a first relational model of the first relational database conform to pattern matching; and a generating module configured to generate a second mapping rule for converting the relational data of the second relational database into RDF format data, based on a mapping relationship between the generated rule and the pattern matching of the first relational model and the second relational model.

Based on the method and apparatus for generating a mapping rule for converting relational data into RDF format data according to embodiments of the present invention, the automatically generated mapping rule can express features of the RDF format data converted from the relational data in the relational database, and the URI generated in accordance with the mapping rule, a user would readily know the key features and information of the corresponding RDF data. The mapping rule better conforms to the user desired effect, and reduces the modification workload of the automatically generated mapping rule by the user.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

In view of the above, there is a need for a method for automatically generating a mapping rule for converting relational data into RDF format data.

Embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
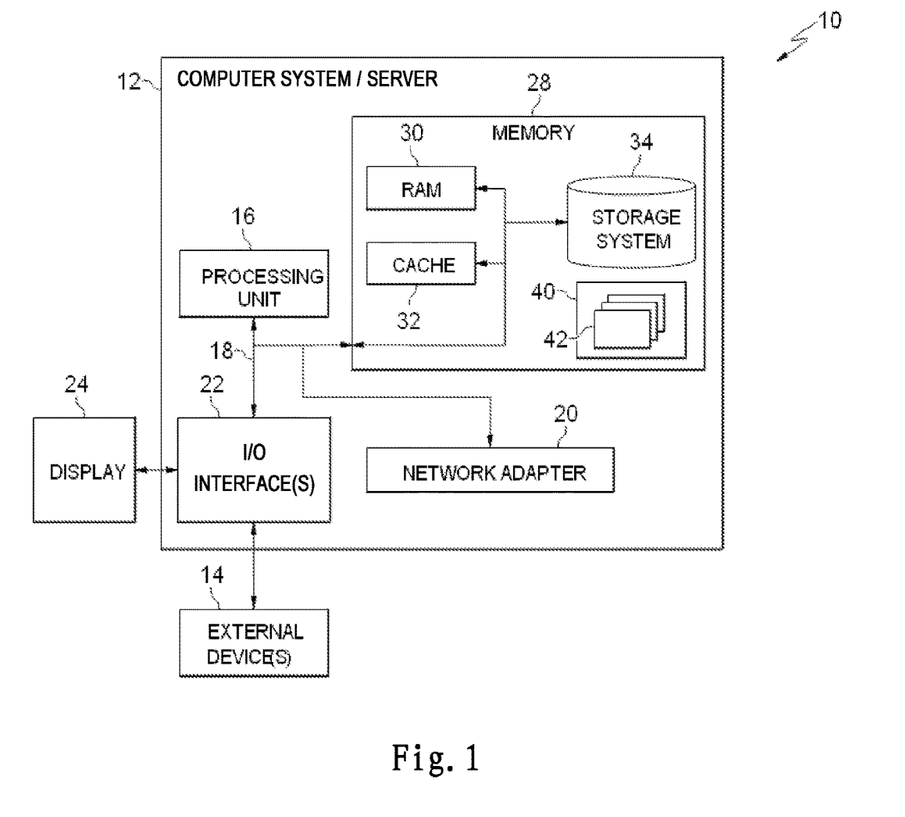
FIG. 1 shows a block diagram of an exemplary computer system/server which is applicable to implement embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
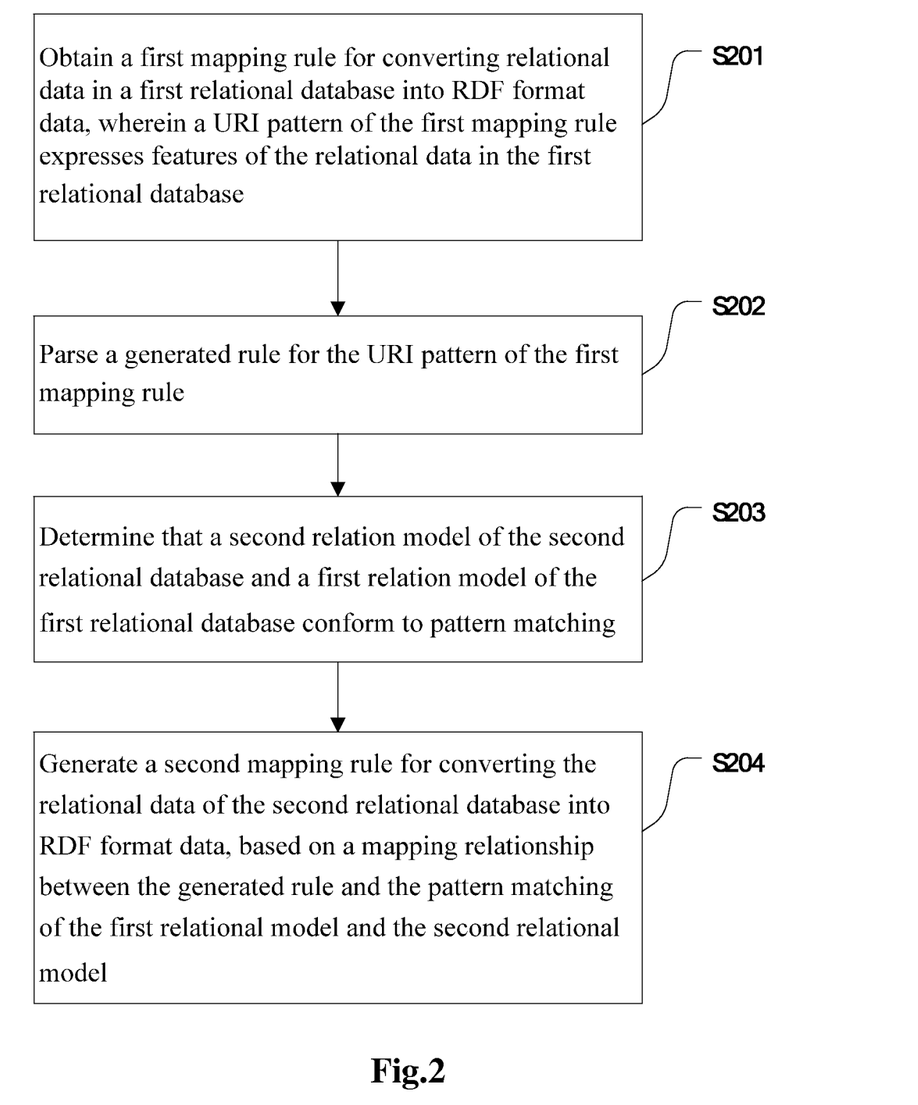
FIG. 2 shows a method for generating a mapping rule for converting relational data into RDF format data according to embodiments of the present invention.

With reference now to FIG. 2, FIG. 2 shows a method for generating a mapping rule for converting relational data into RDF (Resource Description Framework) format data according to embodiments of the present invention, comprising: in Operation S201, obtaining a first mapping rule for converting relational data in a first relational database into RDF format data, wherein a URI (Universal Resource Identifier) pattern of the first mapping rule expresses features of the relational data in the first relational database; in Operation S202, parsing a generated rule for the URI pattern of the first mapping rule; in Operation S203, determining that a second relational model of the second relational database and a first relational model of the first relational database conform to pattern matching; in Operation S204, generating a second mapping rule for converting the relational data of the second relational database into RDF format data, based on a mapping relationship between the generated rule and the pattern matching of the first relational model and the second relational model.

In Operation S201, a first mapping rule for converting relational data in a first relational database into RDF format data is obtained, wherein a URI (Universal Resource Identifier) pattern of the first mapping rule expresses features of the relational data in the first relational database.

The URI pattern generated by the mapping rule automatically generated based on a tool comprises a unique-resource-identifying portion, wherein the unique-resource-identifying portion is generated by a primary key name in the relational model of the relational database. However, the primary key name in the relational model is normally an auto-incrementing numerical value and is meaningless. Thus, in order to express the features of the relational data to enable the generated URI to reflect the features of the RDF data, it is necessary to modify the automatically generated mapping rule; according to the embodiments of the present invention, the modified mapping rule corresponds to the first mapping rule, and the URI pattern of the first mapping rule comprises a unique-resource-identifying portion and a feature portion, wherein the feature portion includes a table name and at least one column name contained in the first relational model of the first relational database; and the URI generated based on the first mapping rule can express the features of the RDF format data.

The relational model is a data model of the relational database. In the relational model, no matter the entity or the relation between entities is indicated by a single structure relation, i.e., a two-dimensional table. Each two-dimensional table consists of rows and columns. Each row of the table is a piece of data record, and each column of the table is defined by a unique column name; the element in the Ith row and the Jth column in the table records the value of the Ith data record in the Jth column. The relational model selects certain one or more columns capable of uniquely identifying a data record as the primary key name. In the real application, generally each entity is designed as a table, for example, 3 tables respectively store three types of different entities, i.e., journal articles, authors and titles; the column of each table represents the property features of the entity, e.g., the property features of the author comprising name, age, occupation, etc.

A tool, e.g., D2R, for publishing relational data to RDF data is used to generate a mapping rule that uses mapping language to describe the mapping relationship in RDF format to form a mapping file; the mapping file functions to convert, when accessing the relational data, the query language SPARQL of the RDF data into SQL data query type of the relational database, and to convert the SQL query result into RDF triples. Taking the mapping language of D2R, i.e., D2RQ Mapping as an example, acting as a declarative language, it is used to describe the mapping relationship between the relational data pattern and RDFS Vocabularies or OWL. The semantic mapping of the language comprises two portions:

(1) URI Pattern Definition

In RDF format data, any resource is identified using HTTP URI so as to be accessed via HTTP protocol and implement Web-based access and interconnection. D2RQ mapping language provides a description template mechanism generated by URI to guide generating real URI of an instantiation resource, and it specifically comprises 4 manners: Absolute URI Pattern, Relative URI Pattern, URI Columns Pattern and Blank Nodes Pattern. Taking the Absolute URI Pattern as an example, i.e., using d2rq:uripattern property to configure each table object in a form such as http://namespace/personalinfo/@@personalinfo.id@@, where namespace represents the domain name space for publishing data; the portion between two "/" is the table name; the unique-resource-identifying portion between two "@@" is the primary key name of a table of the relational model in the relational database, and is used to uniquely identify the RDF format data converted by the relational data of the corresponding table in the relational database.

(2) Class and Property Mapping

ClassMap in the Class mapping (d2rq: ClassMaps) represents a group of similar classes in one class or ontology, and it is mapped to a table in the relational database.

Property mapping (d2rq: PropertyBridge) represents the property of class, and it corresponds to the column of certain table in the relational database.

Table 1 shows the table personalinfo of the relational database DB1 according to embodiments of the present invention. The mapping rule 1 automatically generated based on the tool is shown as below. The unique-resource-identifying portion in the URI pattern is the portion between two "@@," i.e., Personalinfo.id, wherein id is the primary key name of table 1. However, the primary key names of the table in the relational database are all an auto-incrementing numerical value and are meaningless. Thus, in order to express the features of the relational data to enable the generated URI to reflect the features of the RDF data, it is necessary to manually modify the class mapping of the mapping rule to add the feature portion of the URI pattern.

Table 1 shows personalinfo of the relational database DB1

| ID | Firstname | Lastname | Sex |
|----|-----------|----------|-----|
| 1  | San       | Zhang    | M   |
| 2  | Si        | Li       | M   |
| 3  | Wu        | Wang     | F   |

The mapping rule 1 automatically generated by the tool is as below:
 Map: Person a d2rq:classMap
  d2rq:dataStorage map DB1
  D2rq:class Person
  D2rq:uriPattern http://abc.cn/personalinfo/@@Personalinfo.id@@
 Map: Sex a d2rq PropertyBridge
  d2rq:belongsToClassMap Map Person
  d2rq:Property sex
  d2rq:column "PersonalInfo.Sex"
  d2rq:datatype String
   Map: Firstname a d2rq PropertyBridge
    d2rq:belongsToClassMap Map Person
    d2rq:Property firstname
    d2rq:column "PersonalInfo.FirstName"
    d2rq:datatype String
   Map: FamilyName a d2rq PropertyBridge
    d2rq:belongsToClassMap Map Person
    d2rq:Property lastname
    d2rq:column "PersonalInfo.LastName"
 d2rq:datatype String
The modified URI pattern is:
http://abc.cn/personalInfo/
 @@PersonalInfo.Firstname@@_@@PersonalInfo.Lastname@@_@@PersonalInfo.id@@, the column names Firstname and Lastname of the personalinfo are added between two "@@" to enable the URI pattern to reflect the features of the relational data. The modified mapping rule 2 is as below:
 Map: Person a d2rq:classMap
  d2rq:dataStorage map DB1
  D2rq:class Person
  D2rq:uriPattern
http://abc.cn/personalInfo/
 @@PersonalInfo.Firstname@@_@@PersonalInfo.Lastname@@_@@PersonalInfo.id@@
 Map: Sex a d2rq PropertyBridge
  . . .
 Map: Firstname a d2rq PropertyBridge
  . . .
 Map: FamilyName a d2rq PropertyBridge
  . . .

Figure 3:
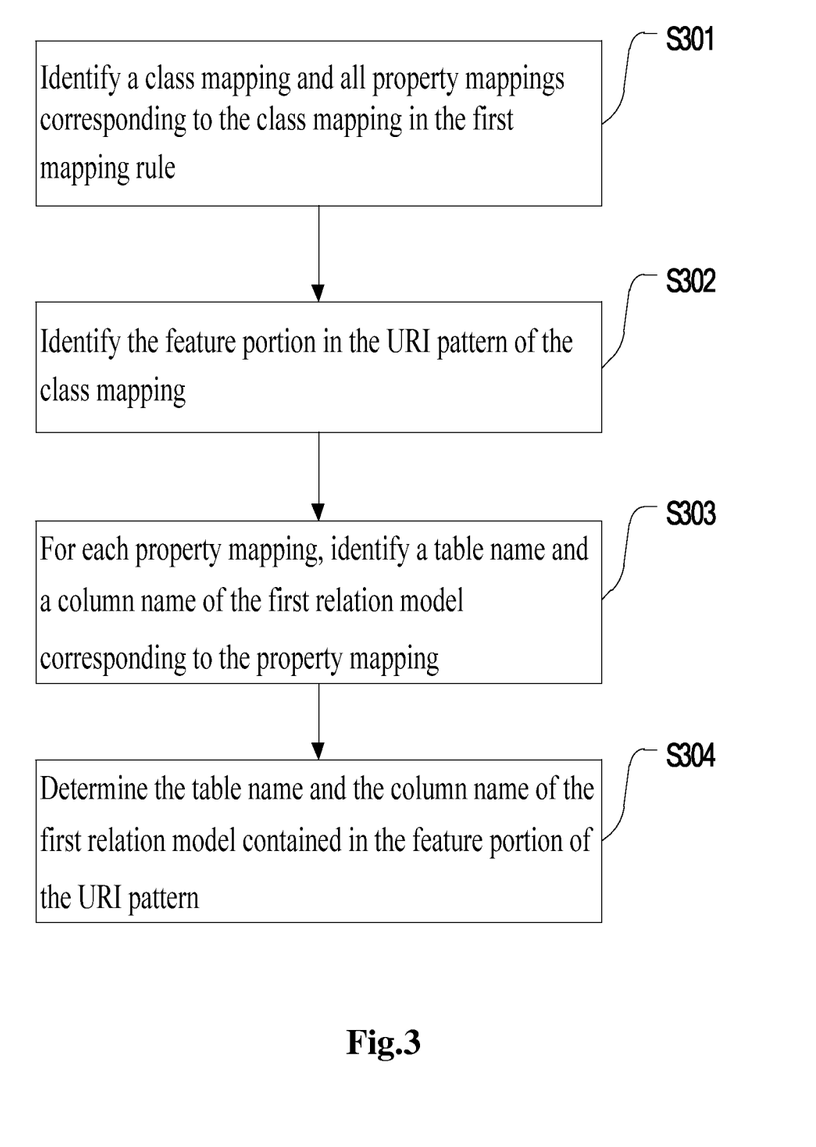
FIG. 3 shows a method for parsing a generated rule for the URI pattern of the first mapping rule according to embodiments of the present invention.

In Operation S202, a generated rule for the URI pattern of the first mapping rule is parsed, wherein the first mapping rule is the modified mapping rule, and the mapping rule is parsed based on the grammar specification of the mapping rule. FIG. 3 shows a method for parsing a generated rule for the URI pattern of the first mapping rule according to embodiments of the present invention, wherein the method further comprises: in Operation S301, identifying a class mapping and all property mappings corresponding to the class mapping in the first mapping rule; in Operation S302, identifying the feature portion in the URI pattern of the class mapping, specifically, extracting all character strings for identifying the unique-resource-identifying portion and the feature portion in the URI pattern, determining the unique-resource-identifying portion based on a primary key name of the first relational model, identifying the character strings other than the unique-resource-identifying portion in all character strings as the feature portion; in Operation S303, for each property mapping, identifying a table name and a column name of the first relational model corresponding to the property mapping; in Operation S304, determining the table name and the column name of the first relational model contained in the feature portion of the URI mode. Generally there are multiple class mappings in the mapping rule, and Operations S301 to S304 are executed repeatedly for each class mapping.

Taking the modified mapping rule 2 as an example, firstly, the class mapping person defined in the mapping file is identified based on Map: Person a d2rq:classMap, and the property mapping Sex corresponding to the class mapping person is identified based on Map: Sex a d2rq PropertyBridge, d2rq:column "PersonalInfo.Sex" and it takes values from the column with the table name PersonalInfo and the column name Sex; the property mapping Firstname corresponding to the class mapping person is identified based on Map: firstname a d2rq PropertyBridge, d2rq:column "PersonalInfo.FirstName" and it takes values from the column with the table name PersonalInfo and the column name Firstname; the property mapping FamilyName corresponding to the class mapping person is identified based on Map: FamilyName a d2rq PropertyBridge, d2rq:column "PersonalInfo.Lastnaem" and it takes values from the column with the table name PersonalInfo and the column name Lastname; then all character strings for the unique-resource-identifying portion and the feature portion of URI are extracted from the URI pattern of the class mapping person, i.e., the character strings "PersonalInfo.Firstname," "PersonalInfol.Lastname" and "PersonalInfo.id" between two @@ are identified; the generated rule for the character strings of the unique-resource-identifying portion in the URI pattern is determined based on the table name and the column name and is composed of "table name PersonalInfo. column name Firstname," "table name PersonalInfo. column name Lastname" and "table name PersonalInfo. primary key name ID."

In Operation S203, it is determined that a second relational model of the second relational database and a first relational model of the first relational database conform to pattern matching. The target of the pattern matching is to look for semantic corresponding relation between two or more pattern elements. The pattern matching technique comprises a single matching technique and a combined matching technique. For the single pattern matching technique, generally the following factors are taken into account:

(1) Pattern based matching: only pattern information is considered, rather than instance data. Available pattern information comprises some properties of the pattern element, e.g., element name, description, data type of the element instance, relation type, restriction and pattern structure.

(2) Instance based matching: the instance level data is considered, and the content and meaning represented by the pattern element can be recognized by the instance level data.

(3) Element based matching: single pattern element is matched, and for each element in the first input pattern, a matching element is determined in the second input pattern.

(4) Structure based matching: the structure based matching technique can excavate a matching combination of the elements appearing together in the structure.

(5) Linguistics based matching: the name and text are applied to excavate the pattern elements similar in semantics, and the main technique comprises name based matching and description matching.

(6) Restriction based matching: for defining the data type, the range of the data value, the uniqueness, the optionality, the relation type, etc., there is generally a pattern restriction; if two input patterns both comprise such restriction information, the restriction information can be used to determine the similarity degree of the pattern elements.

(7) Matching cardinality based matching: the matching cardinality refers to the number of entities that one entity in an entity set can be associated with another entity set via an association set. Based on the matching cardinality, the pattern matching can be divided into four types: 1:1 matching, 1:n matching, n:1 matching and n:m matching.

There are two manners for the combined matching technique, one is a mixed matcher and the other is a synthetic matcher. The mixed matcher synthesizes multiple matching techniques based on multiple standards and information sources to determine a candidate matching. The synthetic matcher is to combine the results produced when multiple single matching techniques operate separately, and these separately executed pattern matching techniques may also comprise a mixed matcher. The above technical details for performing pattern matching belong to the prior art scope, which is not detailed here. Based on the above matching techniques, any deformation can be made, and falls into the protection scope of the present invention if only the objective of the present invention can be implemented, and the present invention does not make any restriction on it.

According to embodiments of the present invention, Table 2 shows Employee of the relational database DB2, and the pattern matching is executed on the relational data in Table 1 and Table 2.

Table 2 shows Employee of the relational database DB2

| EID | Firstname | Familyname | Workyear |
|-----|-----------|------------|----------|
| 1   | Hong      | Li         | 1        |
| 2   | Li        | Li         | 3        |
| 3   | Gang      | Wang       | 4        |

Relational model 1
Table Name: PersonalInfo
Column Name: ID
  Firstname
  Lastname
  Sex
Relational model 2
Table Name: Employee
Column Name: EID
  Firstname
  Familyname
  Workyear According to embodiments of the present invention, relational model 1 corresponds to the data pattern of Table 1; relational model 2 corresponds to the data pattern of Table 2; any of the above pattern matching methods is used to perform pattern matching of the relational model 1 and the relational model 2 to obtain a mapping relationship for the pattern matching of the relational model 1 and the relational model 2.

PersonalInfo.ID=Empolyee.EID (the primary key name ID in the first column of the relational model 1 corresponds to the primary key name EID in the first column of the relational model 2), PersonalInfo.Firstname=Employee.Firstname (the second column in the relational model 1 corresponds to the second column in the relational model 2), PersonalInfo.Lastname=Employee.Familyname (the third column in the relational model 1 corresponds to the third column in the relational model 2).

Those skilled in the art know that the execution sequence of Operation S203 is not fixed, and it is independent of the preceding two operations and does not depend on the execution of the preceding two operations. For example, Operation S203 may be executed before Operations S201 and S202, and may also be executed synchronously with Operations S201 and S202, and may also be executed after Operations S201 and S202.

In Operation S204, a second mapping rule for converting the relational data of the second relational database into RDF format data is generated based on a mapping relationship between the generated rule and the pattern matching of the first relational model and the second relational model.

Figure 4:
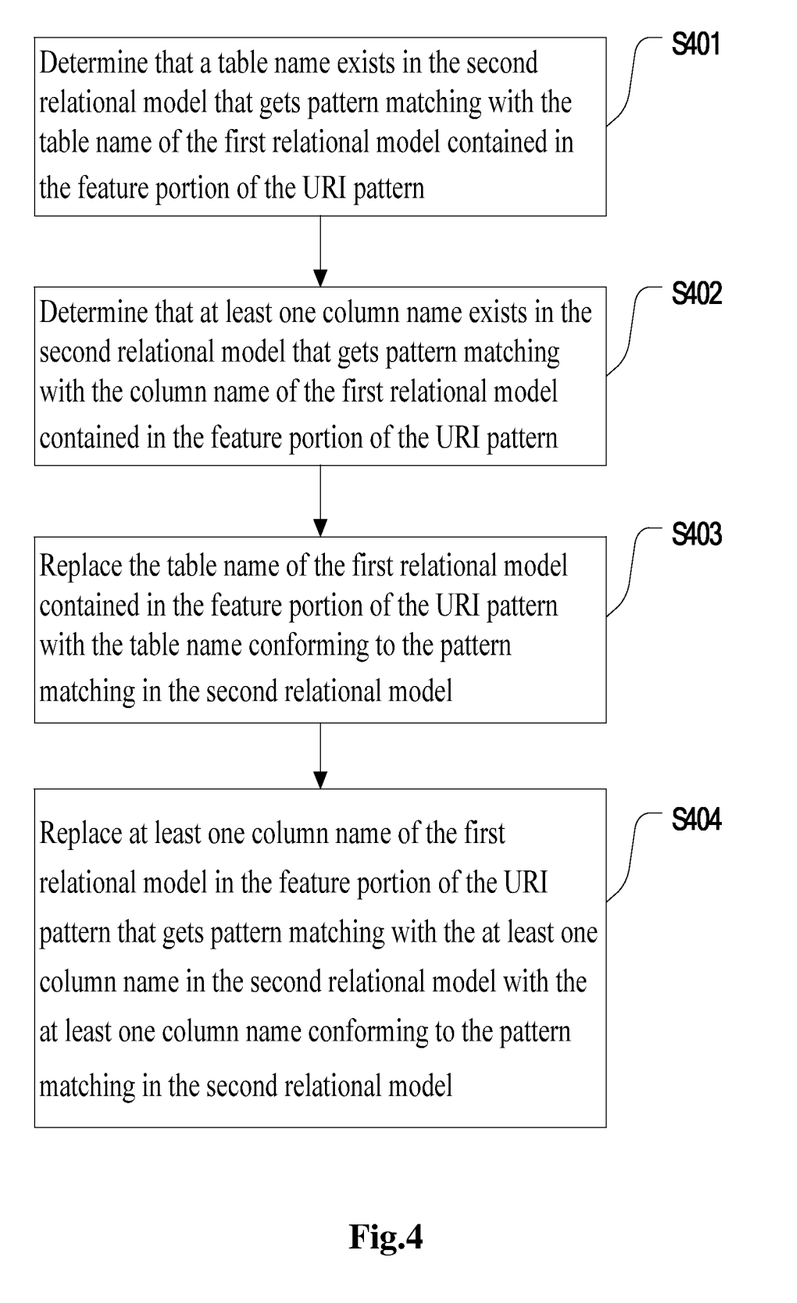
FIG. 4 shows a method for generating a second mapping rule for converting the relational data of the second relational database into RDF format data according to embodiments of the present invention.

Specifically, FIG. 4 shows a method for generating a second mapping rule for converting the relational data of the second relational database into RDF format data according to embodiments of the present invention, the method comprising: in Operation S401, determining that a table name exists in the second relational model that gets pattern matching with the table name of the first relational model contained in the feature portion of the URI pattern; in Operation S402, determining that at least one column name exists in the second relational model that gets pattern matching with the column name of the first relational model contained in the feature portion of the URI pattern; in Operation S403, replacing the table name of the first relational model contained in the feature portion of the URI pattern with the table name conforming to the pattern matching in the second relational model; in Operation S404, replacing at least one column name of the first relational model in the feature portion of the URI pattern that gets pattern matching with the at least one column name in the second relational model with the at least one column name conforming to the pattern matching in the second relational model.

According to embodiments of the present invention, the mapping relationship for the pattern matching of Table 2 in DB2 and Table 1 of DB1 and the generated rule of the mapping rule 2 for Table 1 in DB1 are used to generate a mapping rule for converting the relational data in Employee of Table 2 in DB2 into RDF format data, i.e., "Emloyee.EID," "Employee.Firstname" and "Employee.Familyname" are respectively used to replace the character strings "PersonalInfo.id," "PersonalInfo.Firstname" and "PersonalInfo.Lastname" for the unique-resource-identifying portion of the URI in the URI pattern in the mapping rule 2 in Table 1 to thereby generate the mapping rule 3 in Table 2 in DB2:

Map: Person a d2rq:classMap
   d2rq:dataStorage map DB2
   D2rq:class Person
   D2rq:uriPattern
http://def.cn/employee/
   @@Employee.Familyname@@_@@Employee.
   Firstname@@_@@Employee.EID@@
Map: Workyear a d2rq PropertyBridge
   d2rq:belongsToClassMap Map Person
   d2rq:Property Workyear
   d2rq:column "Employee.Workyear"
   d2rq:datatype String
Map: Firstname a d2rq PropertyBridge
   d2rq:belongsToClassMap Map Person
   d2rq:Property Firstname
   d2rq:column "Employee.Firstname"
   d2rq:datatype String
Map: Familyname a d2rq PropertyBridge
   d2rq:belongsToClassMap Map Person
   d2rq:Property Familyname
   d2rq:column "Employee.Familyname"
   d2rq:datatype String The existing method generates mapping rules by independent mapping engines for relational data of each relational database. Respective mapping engines are independent from each other and invisible to each other. According to embodiments of the present invention, the first mapping rule and the second mapping rule are both managed by a unified mapping engine; parsing the modified mapping rule and automatically generating, based on the parsing result, the mapping rule for relational data in other relational databases conforming to the pattern matching are implemented by the mapping engine to thereby reuse the previously modified mapping rule when generating other mapping rules, without manually modifying each mapping rule.

For the URI of the mapping rule automatically generated according to embodiments of the present invention, since it expresses features of the relational data, a user would readily learn the key features of the corresponding RDF data, and the mapping rule more conforms to the user desired effect and reduces the modification of the automatically generated mapping rule by the user.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing various operations in the above method in software, hardware or a combination of software and hardware, there may be provided an apparatus for generating a mapping rule for converting relational data into RDF format data. Even if the apparatus has the same hardware structure as a general-purpose processing device, the functionality of software contained therein makes the apparatus manifest distinguishing properties from the general-purpose processing device, thereby forming an apparatus of the various embodiments of the present invention.

Figure 5:
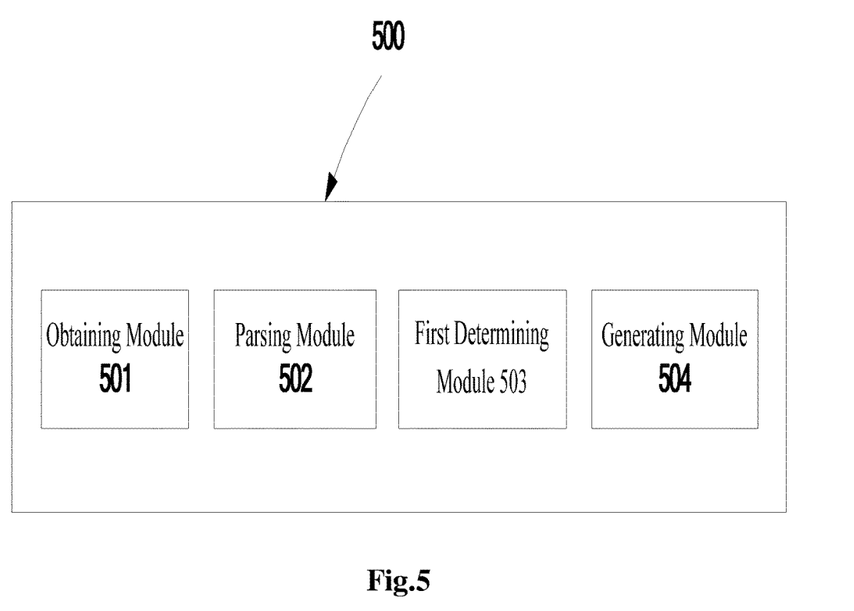
FIG. 5 shows an apparatus for generating a mapping rule for converting relational data into RDF format data according to embodiments of the present invention.

Based on the same inventive concept, according to embodiments of the present invention, there is also provided an apparatus for generating a mapping rule for converting relational data into RDF format data. FIG. 5 shows an apparatus 500 for generating a mapping rule for converting relational data into RDF format data according to embodiments of the present invention, comprising: an obtaining module 501 configured to obtain a first mapping rule for converting relational data in a first relational database into RDF format data, wherein a URI pattern of the first mapping rule expresses features of the relational data in the first relational database; a parsing module 502 configured to parse a generated rule for the URI pattern of the first mapping rule; a determining module 503 configured to determine that a second data pattern of the second relational database and a first data pattern of the first relational database conform to pattern matching; and a generating module 504 configured to generate a second mapping rule for converting the relational data of the second relational database into RDF format data, based on a mapping relationship between the generated rule and the first data pattern and the second data pattern.

Wherein the URI pattern of the first mapping rule comprises a unique-resource-identifying portion and a feature portion, wherein the feature portion includes a table name and at least one column name contained in the first data pattern.

According to embodiments of the present invention, wherein the parsing module 502 is further configured as: a first identifying module configured to identify a class mapping and all property mappings corresponding to the class mapping in the first mapping rule; a second identifying module configured to identify the feature portion in the URI pattern of the class mapping; a third identifying module configured to identify, for each property mapping, a table name and a column name of the first data pattern corresponding to the property mapping; a second determining module configured to determine the table name and the column name of the first data pattern contained in the feature portion of the URI pattern.

According to embodiments of the present invention, wherein the second identifying module is further configured to: extract all character strings for identifying the unique-resource-identifying portion and the feature portion in the URI pattern; determine the unique-resource-identifying portion based on a primary key name of the first data pattern; identify the character strings other than the unique-resource-identifying portion in all character strings as the feature portion.

According to embodiments of the present invention, wherein the generating module 504 is further configured to: determine that a table existing in the second relational model that gets pattern matching with the table name of the first relational model contained in the feature portion of the URI pattern; determine that at least one column name existing in the second data pattern that gets pattern matching with the column name of the first data pattern contained in the feature portion of the URI pattern; replace the table name of the first relational model contained in the feature portion of the URI pattern with the table name conforming to the pattern matching in the second relational model; replace at least one column name of the first relational model in the feature portion of the URI pattern that gets pattern matching with the at least one column name in the second relational model with the at least one column name conforming to the pattern matching in the second relational model.

According to embodiments of the present invention, wherein the parsing module and the generating module are implemented by a unified mapping engine.

The specific implementing method for each of the above modules may refer to the detailed description of the method for generating a mapping rule for converting relational data into RDF format data according to embodiments of the present invention, which is not detailed here.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for generating a mapping rule for converting relational data into resource description framework (RDF) format data, comprising:
    obtaining a first mapping rule for converting relational data in a first relational database into RDF format data, wherein a Universal Resource Identifier (URI) pattern of the first mapping rule expresses features of the relational data in the first relational database;
    parsing a generated rule for the URI pattern of the first mapping rule;
    determining that a second relational model of the second relational database and a first relational model of the first relational database conform to pattern matching, the pattern matching comprising performing a single matching technique, the single matching technique using linguistics based matching by applying a name and text to excavate pattern elements similar in semantics; and
    generating a second mapping rule, to form a mapping file, for converting the relational data of the second relational database into RDF format data, based on a mapping relationship between the generated rule and the pattern matching of the first relational model and the second relational model, wherein the mapping file functions to convert, when accessing the relational data, a query language SPARQL of the RDF format data into an SQL data query type of the second relational database, and to convert an SQL query result into RDF triples.

2. The method of claim 1, wherein the URI pattern of the first mapping rule comprises a unique-resource-identifying portion and a feature portion, wherein the feature portion includes a table name and at least one column name contained in the first relational model.

3. The method of claim 2, wherein parsing a generated rule for the URI pattern of the first mapping rule comprise:
    identifying a class mapping and all property mappings corresponding to the class mapping in the first mapping rule;
    identifying the feature portion in the URI pattern of the class mapping;
    for each property mapping, identifying a table name and a column name of the first relational model corresponding to the property mapping;
    determining the table name and the column name of the first relational model contained in the feature portion of the URI pattern.

4. The method of claim 3, wherein identifying the feature portion in the URI pattern of the class mapping comprises:
    extracting all character strings for identifying the unique-resource-identifying portion and the feature portion in the URI pattern;
    determining the unique-resource-identifying portion based on a primary key name of the first relational model; and
    identifying, in all character strings, the character strings other than the unique-resource-identifying portion as the feature portion.

5. The method of claim 1, wherein the generating a second mapping rule for converting the relational data of the second relational database into RDF format data based on a mapping relationship between the generated rule and the pattern matching of the first relational model and the second relational model comprises:
- determining that a table name exists in the second relational model that gets pattern matching with the table name of the first relational model contained in the feature portion of the URI pattern;
- determining that at least one column name exists in the second relational model that gets pattern matching with the column name of the first relational model contained in the feature portion of the URI pattern;
- replacing the table name of the first relational model contained in the feature portion of the URI pattern with the table name conforming to the pattern matching in the second relational model;
- replacing at least one column name of the first relational model in the feature portion of the URI pattern that gets pattern matching with the at least one column name in the second relational model with the at least one column name conforming to the pattern matching in the second relational model.

6. The method of claim 1, wherein parsing the first mapping rule and generating the second mapping rule are implemented by a unified mapping engine.

7. The method of claim 1, wherein the pattern matching comprises a combined matching technique, the combined matching technique comprising a mixed matcher to synthesize multiple matching techniques based on multiple standards and information sources to determine a candidate matching.

8. The method of claim 1, wherein the pattern matching comprises a combined matching technique, the combined matching technique comprising a synthetic matcher to combine result produced when multiple single matching techniques operate separately.

9. The method of claim 1, wherein the single matching technique further takes into account pattern based matching, instance based matching, element based matching, structure based matching, restriction based matching, and cardinality based matching.

* * * * *